United States Patent [19]

Steppe

[11] 4,233,469
[45] Nov. 11, 1980

[54] CONDUIT BUSHING

[76] Inventor: Theodore W. Steppe, P.O. Box 46, Kennedy, N.Y. 14747

[21] Appl. No.: 12,051

[22] Filed: Feb. 13, 1979

[51] Int. Cl.³ .......................... H02G 3/04; H01B 17/58
[52] U.S. Cl. ............................................ 174/83; 16/2; 138/96 T; 174/65 R
[58] Field of Search ................... 174/65 R, 65 G, 83, 174/152 G, 153 G; 16/2; 138/96 T; 285/419

[56] References Cited

U.S. PATENT DOCUMENTS

| | | | |
|---|---|---|---|
| 2,245,422 | 6/1941 | Whittaker | 174/83 X |
| 2,470,886 | 5/1949 | Buzzell | 174/83 X |
| 2,900,435 | 8/1959 | Curtiss | 174/83 |
| 3,627,904 | 12/1971 | Milne | 174/83 |
| 3,711,632 | 1/1973 | Ghirardi | 285/419 X |

FOREIGN PATENT DOCUMENTS 189678  4/1957  Austria .................. 174/65 R

Primary Examiner—Laramie E. Askin

[57] ABSTRACT

A conduit bushing for attachment to the end of a conduit for electrical wiring is made up of a round collar-like member of electrical insulating material divided diametrically into two halves hinged together with an integral hinge having a lock for locking the halves together. The bushing has an inwardly directed flange at one end which protects the insulation of the wiring. The bushing can be installed around the wire after the wire has been installed.

1 Claim, 6 Drawing Figures

CONDUIT BUSHING

GENERAL DESCRIPTION OF THE INVENTION

Electricians sometimes by mistake omit the bushings from the end of conduit at junction boxes until after they have installed the wiring. It is impossible to install conventional conduit bushing around the wire on the end of conduit after the wires are connected. It is, therefore, necessary to disconnect the wiring to install the bushing or leave the bushing out, thereby leaving the wires exposed to damage by the end of the conduit.

Applicant has provided a bushing of electrical insulating material made in two sections hinged together which can be placed around the end of the conduit after the wiring has been installed with no inconvenience to the operator.

REFERENCE TO PRIOR ART

Various conduit bushings have been proposed and various hinged couplings such as shown in U.S. Pat. No. 3,456,965 which shows a hinge plastic coupling for tubing. However, to applicant's knowledge no one has ever provided a hinge bushing for electrical conduit.

OBJECTS OF THE INVENTION

It is an object of the invention to provide an improved conduit bushing.

Another object of the invention is to provide a conduit bushing that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
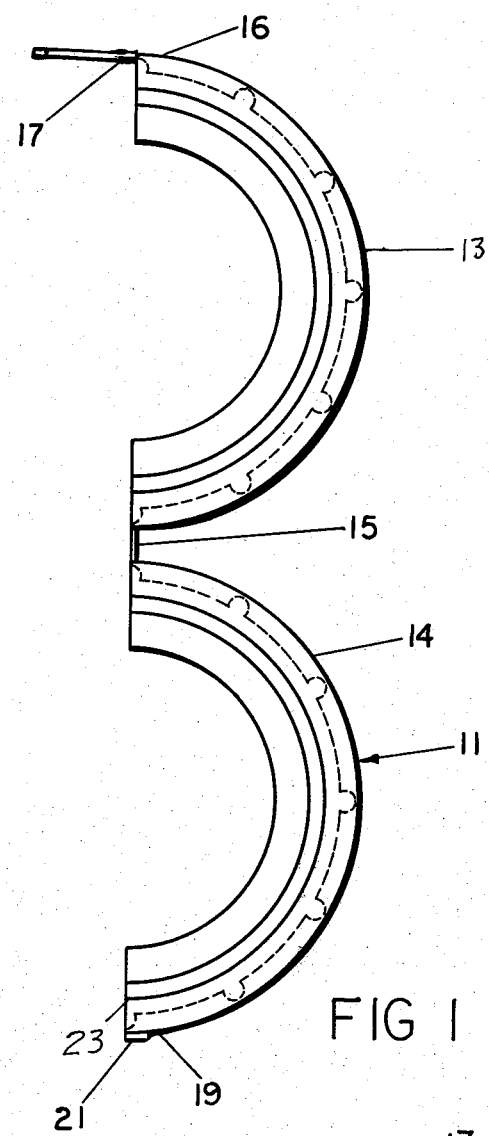
FIG. 1 is an end view of the conduit bushing with pieces thereof swinging apart from each other.

Now, with more particular reference to the drawings. I show an assembly 10 of two bushings 11, according to the invention, installed in a conduit box 12. Each bushing is fabricated out of electrical insulating material and is divided into two halves 13 and 14, connected together by an integral hinge 15. The bushing is in the form of a round collar divided along a diameter into the two parts which are connected by the integral hinge 15.

The end 16 of the half 13 terminates in the strap 17 which is integrally connected to the end of the bushing and has an opening 18 therein. The end 19 of the bushing terminates in the end 20 which has a male lug 21 thereon. The male lug 21 is received in the female opening 18 when the collar is installed.

Figure 2:
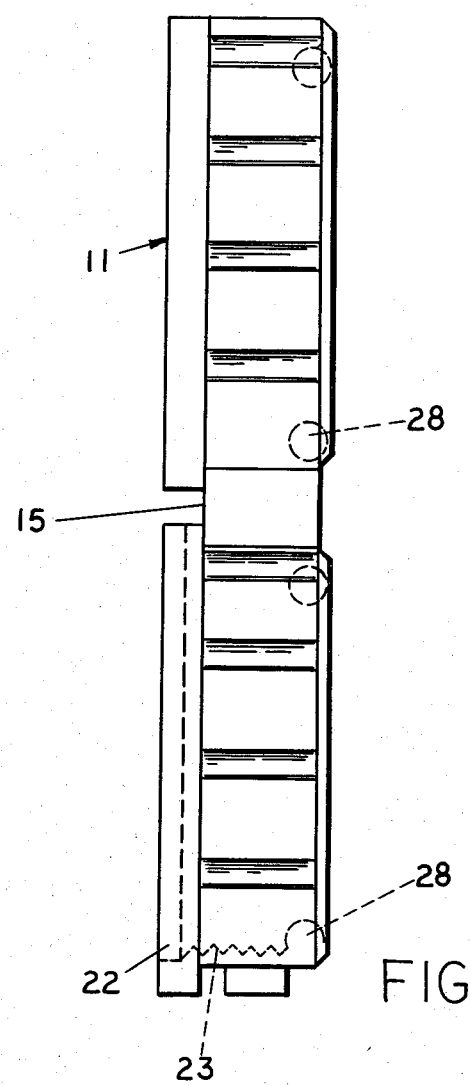
FIG. 2 is a side view of the conduit bushing with the sides swinging away from each other.
Figure 3:
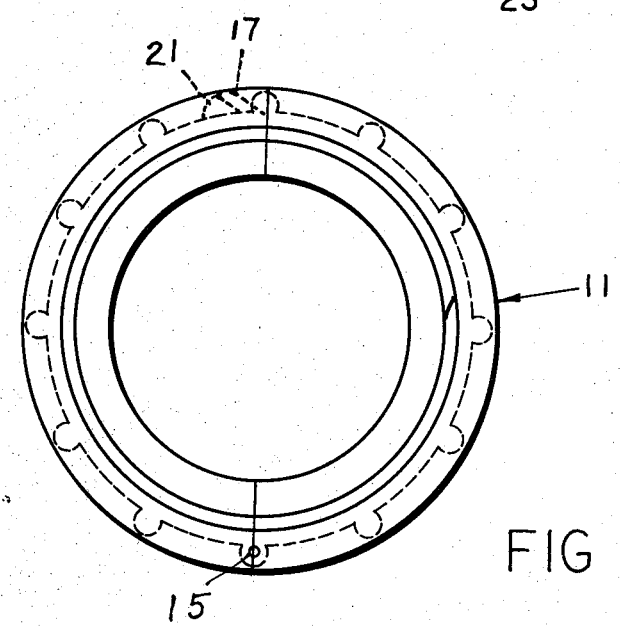
FIG. 3 is an end view of the bushing.
Figure 4:
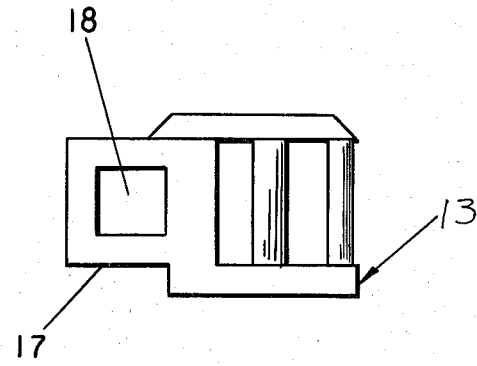
FIG. 4 is an enlarged partial view of the end of the bushing.
Figure 5:
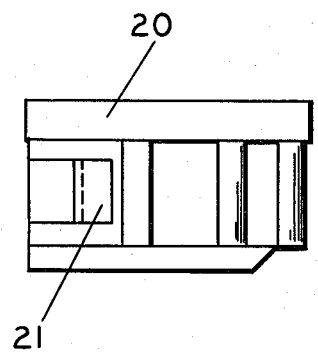
FIG. 5 is an enlarged partial end view of the opposite end from FIG. 4.
Figure 6:
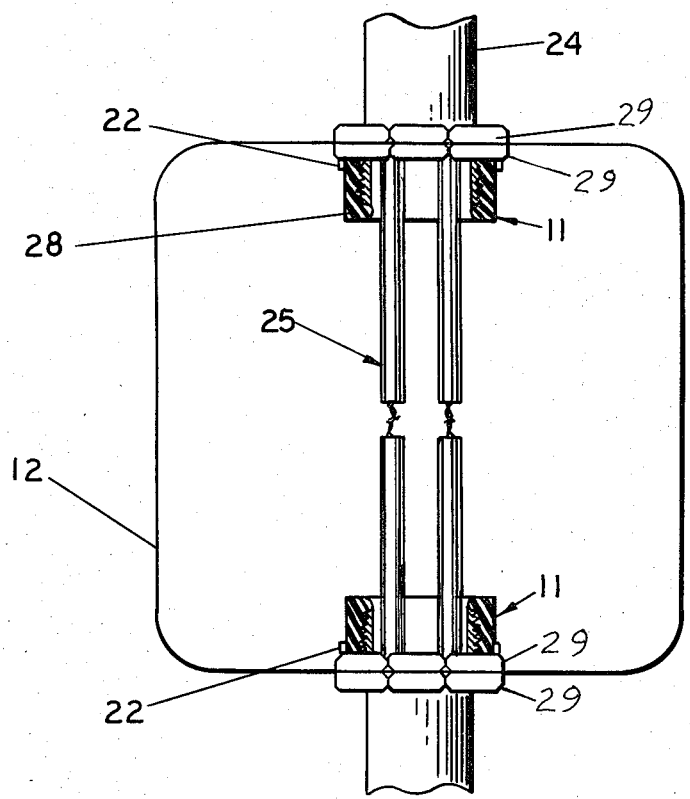
FIG. 6 is a view showing two of the conduit bushings installed on the ends of conduits attached to sides of a junction box with electrical wires extending from one conduit to another.

The collars have an inwardly directed rounded flange 28 adjacent the threaded portion 23, and an outwardly directed flange 22 at the opposite end. The bushings 11 are installed on the end of conduit parts 24 by releasing the latches 17 and 21 and swinging halves 13 and 14 of bushing 11 to the position shown in FIG. 2 and installing them around the end of the conduit 24 either before or after the wiring 25 is installed and the wires connected. Conduit nuts 29 hold the conduit 24 to the box 12.

The junction box 12 is of a type familiar to those skilled in the art and will be readily recognized by persons familiar with this type of apparatus.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A conduit bushing comprising,
   an annular, internally threaded member having a first end and a second end,
   circumferentially spaced axially extending ribs on the outer periphery of said member,
   an outwardly directed flange on said member at said first end thereof extending outward and overlying the ends of said axially extending ribs and integrally attached to said ribs,
   an inwardly directed flange on said member at said second end thereof,
   said member being divided along a diameter thereof into a first half and a second half,
   said first half and said second half each having a first end and a second end,
   an integral hinge connecting said first end of said first half to said first end of said second half,
   first latch means comprising a strap having an opening therein integrally connected to said second end of said first half end extending therefrom and overlying said second end of said second half,
   second latch means comprising a male lug fixed to said second end of said second half,
   said opening in said strap being adapted to receive said male lug for holding said first half and said second half together, and
   said strap having an outer surface disposed substantially flush with the outer periphery of said outwardly directed flange.

* * * * *